(12) United States Patent
Jojic et al.

(10) Patent No.: US 7,657,102 B2
(45) Date of Patent: Feb. 2, 2010

(54) SYSTEM AND METHOD FOR FAST ON-LINE LEARNING OF TRANSFORMED HIDDEN MARKOV MODELS

(75) Inventors: Nebojsa Jojic, Redmond, WA (US); Nemanja Petrovic, Champaign, IL (US)

(73) Assignee: Microsoft Corp., Redmond, WA (US)

( * ) Notice: Subject to any disclaimer, the term of this patent is extended or adjusted under 35 U.S.C. 154(b) by 925 days.

(21) Appl. No.: 10/649,382

(22) Filed: Aug. 27, 2003

(65) Prior Publication Data
US 2005/0047646 A1   Mar. 3, 2005

(51) Int. Cl.
*G06K 9/62* (2006.01)
*G10L 15/06* (2006.01)

(52) U.S. Cl. .................................. 382/224; 704/245
(58) Field of Classification Search ............... 382/224
See application file for complete search history.

(56) References Cited

U.S. PATENT DOCUMENTS

| | | | | |
|---|---|---|---|---|
| 5,487,117 | A * | 1/1996 | Burges et al. | 382/173 |
| 5,598,507 | A * | 1/1997 | Kimber et al. | 704/246 |
| 5,806,030 | A * | 9/1998 | Junqua | 704/245 |
| 5,892,847 | A | 4/1999 | Johnson | |
| 5,925,065 | A * | 7/1999 | Totakura et al. | 606/229 |
| 6,073,096 | A * | 6/2000 | Gao et al. | 704/245 |
| 6,404,925 | B1 | 6/2002 | Foote et al. | 382/224 |
| 6,591,146 | B1 * | 7/2003 | Pavlovic | 700/29 |
| 6,668,080 | B1 | 12/2003 | Torr et al. | |
| 7,113,185 | B2 * | 9/2006 | Jojic et al. | 345/420 |
| 7,127,127 | B2 * | 10/2006 | Jojic et al. | 382/305 |

OTHER PUBLICATIONS

Dellaert, The Expectation Maximization Algorithm, College of Computing, Georgia Institute of Technology, Technical Report No. GIT-GVU-02-20, Feb. 2002.*
U.S. Appl. No. 10/294,211, filed Nov. 14, 2002, Jojic et al.
Bauer, E., D. Coller and Y. Singer, Update rules for parameter estimation in Bayesian networks, *Proc. of the 13th UAI*, Providence, Rhode Island, Aug. 1-3, 1997, pp. 3-13.

(Continued)

*Primary Examiner*—Bhavesh M Mehta
*Assistant Examiner*—David P Rashid
(74) *Attorney, Agent, or Firm*—Lyon & Harr, LLP; Katrina A. Lyon

(57) ABSTRACT

A fast variational on-line learning technique for training a transformed hidden Markov model. A simplified general model and an associated estimation algorithm is provided for modeling visual data such as a video sequence. Specifically, once the model has been initialized, an expectation-maximization ("EM") algorithm is used to learn the one or more object class models, so that the video sequence has high marginal probability under the model. In the expectation step (the "E-Step"), the model parameters are assumed to be correct, and for an input image, probabilistic inference is used to fill in the values of the unobserved or hidden variables, e.g., the object class and appearance. In one embodiment of the invention, a Viterbi algorithm and a latent image is employed for this purpose. In the maximization step (the "M-Step"), the model parameters are adjusted using the values of the unobserved variables calculated in the previous E-step.

29 Claims, 7 Drawing Sheets

OTHER PUBLICATIONS

Black, M. J., and D. J. Fleet, Probabilistic detection and tracking of motion discontinuities, *Int'l. J. on Comp. Vision*, 2000.

Frey, B., and N. Jojic, Fast, large-scale transformation-invariant clustering, *Advances in Neural Information Processing Systems*, (NIPS 2001), 14, Cambridge, MA, MIT Press 2002.

Frey, B., and N. Jojic, Estimating mixture models of images and inferring spatial transformations using the EM algorithm, *Comp. Vision and Pattern Recognition (CVPR)*, Fort Collins, Jun. 23-25, 1999, pp. 416-422.

Jepson, A., and M. J. Black, Mixture models for optical flow computation, *Proc. of the IEEE Conf. on Comp. Vision and Pattern Recognition*, Jun. 1993, pp. 760-761.

Jojic, N., and B. Frey, Learning flexible sprites in video layers, *IEEE Conf. on Comp. Vision and Pattern Recognition (CVPR)*, 2001.

Jojic, N., N. Petrovic, B. Frey and T. Huang, Transformed hidden Markov models: Estimating mixture models and inferring spatial transformations in video sequences, *IEEE Conf. on Comp. Vision and Pattern Recognition (CVPR)*, 2000.

Neal, R. M., and G. E. Hinton, A view of the EM algorithm that justifies incremental, sparse and other variants, *Learning in Graphical Models*, Kluwer Academic Publishers, Norwell MA, 1998, Ed. M. I. Jordan, pp. 355-368.

Tao, H., R. Kumar and H. S. Sawhney, Dynamic layer representation with applications to tracking, *Proc. of the IEEE Conf. on Comp. Vision and Pattern Recognition*, 2000.

Torr, P., R. Szeliski, and P. Anandan, An integrated Bayesian approach to layer extraction from image sequences, *IEEE Trans. on Pattern Analysis and Mach. Intelligence*, 2001, vol. 23, No. 3, pp. 297-303.

Wang, J. Y., and E. H. Adelson, Representing moving images with layers, *IEEE Trans. on Image Processing*, 1994, vol. 3, No. 5, pp. 625-638.

Wolf, J. K., A. M. Viterbi and G. S. Dixon, Finding the best set of K paths through a trellis with application to multitarget tracking, *IEEE Trans. on Aerospace & Elect. Sys.*, Mar. 1989, vol. 25, No. 2, pp. 287-296.

Schödl, A., I. Essa, Controlled animation of video sprites, ACM, published Jul. 2002, pp. 121-127 and 196.

Kimbinh T. Nguyen, Office Action, U.S. Appl. No. 10/294,211, Jan. 12, 2005.

Kimbinh T. Nguyen, Notice of Allowance, U.S. Appl. No. 10/294,211, Feb. 17, 2006.

* cited by examiner

SYSTEM AND METHOD FOR FAST ON-LINE LEARNING OF TRANSFORMED HIDDEN MARKOV MODELS

BACKGROUND

1. Technical Field

The invention is related to a system and method for machine learning, and in particular, to a system and method for fast on-line learning of generative models.

2. Related Art

In video scene analysis, machine learning algorithms, such as the transformed hidden Markov Model, capture three typical causes of variability in video-scene/object class, appearance variability within the class and image motion.

A substantial amount of work has been performed using transformed mixtures of Gaussians (TMG) [1, 2], and their temporal extensions, transformed hidden Markov models (THMM) [3], for video analysis. The TMG algorithm performs joint normalization and clustering of the data (e.g., clustering data by a given class). Transformation-invariant clustering models, such as the aforementioned, are suitable for video clustering and indexing, because they account for the variability in appearance and transformation in the objects and scenes.

Further, it has been shown with respect to TMG and TMM that an expectation-maximization (EM) algorithm in a discrete latent variable model can be used to jointly normalize data (e.g., center images, pitch-normalize spectrograms) and to learn a mixture model of the normalized data. Typically, the only input to such an algorithm is the data, a list of possible transformations, and the number of clusters or classes to find. However, conventional methods for performing such computations typically involve an exhaustive computation of the posterior probabilities over transformations that make processing of large sets of transformations intractable.

In general, as is well known to those skilled in the art, an EM algorithm is used to approximate a probability function. EM is typically used to compute maximum likelihood estimates given incomplete samples. In the expectation step (the "E-Step"), the model parameters are assumed to be correct, and for each input image, probabilistic inference is used to fill in the values of the unobserved or hidden variables, e.g., the class, transformation, and appearance. The model typically used in an EM algorithm includes the classes (means and variance) and the probability of each class. In the maximization step (the "M-Step"), the model parameters in the E-step are adjusted to increase the joint probability of the observations and the filled in unobserved variables. These two steps are then repeated until convergence of the model parameters and the observed data is achieved.

As discussed above, a frequently mentioned drawback of the transformation-invariant clustering methods is the computational burden of searching over all transformations. In order to normalize for translations of an object over the cluttered background in video sequences, a large number of possible translational shifts should be considered. For example, there are M×N possible integer shifts in an M×N pixel image. Since the computation time is proportional to the number of pixels and the number of transformations, $O(M^2N^2)$ operations are used for inference, for each component in the Gaussian mixture. It typically takes one hour per iteration of the batch EM algorithm to cluster a 40-second long 44×28 pixel sequence into 5 clusters.

The temporal extension of the TMG, transformed hidden Markov models (THMM), use a hidden Markov chain to capture temporal coherence of the video frames. The size of the state space of such an HMM is CMN where C is the number of components in the Gaussian mixture, and LMN is the number of translations considered. In [2], a forward-backward algorithm is used to estimate the transition probabilities and the parameters of a THMM, but use of this forward-backward algorithm adds additional computational time to the TMG, because the transition matrix of the transformations is large. The forward-backward is also numerically unstable, due to the large number of state-space sequences $((CMN)^T$ for a C-class model for T frames, each having M×N pixels), and the high dimensionality of the data. Only a few state-space paths carry a significant probability mass, and the observation likelihood has a very high dynamic range due to the number of pixels modeled in each sample. This makes the forward-backward algorithm sensitive to the machine precision issues, even when the computation is done in the log domain.

To tackle the computational burden of shift-invariant models, in past work [4], it was proposed to reduce all computationally expensive operations to image correlations in the E step and convolutions with the probability maps in the M step, which made the computation efficient in the Fourier domain. There, the complexity of repeatedly evaluating the likelihood at each stage through I iterations of EM is of the order of O(CIMN log(MN)), thousands of times faster than the technique in [2]. The issues present in the temporal model, THMM, however, still remained.

Therefore, what is needed is a model structure and associated system and method of learning generative models that runs in real-time.

SUMMARY

The system and method according to the invention overcomes the aforementioned limitations in the prior art. It can extract objects from an image sequence using the constraints on their motion and also perform tracking while the appearance models are learned. It can create metadata for stored video. The system and method according to the invention can also be applied to other time-series data such as various audio representations. The invention operates in near real time, processing data and learning generative models at substantially the same rate the input data is received.

The system and method according to the invention tries to recognize patterns in time (e.g., finding possibly recurring scenes or objects in an image sequence), and in order to do so attempts to model the process that could have generated the pattern. It uses the possible states or classes, the probability of each of the classes being in each of the states at a given time and a state transition matrix that gives the probability of a given state given that state at a previous time. The states further may include observable states and hidden states. In such cases the observed sequence of states is probabilistically related to the hidden process. The processes are modeled using a transformed Hidden Markov model (THHM) where there is an underlying hidden Markov process changing over time, and a set of observable states which are related somehow to the hidden states. The connections between the hidden states and the observable states represent the probability of generating a particular observed state given that the Markov process is in a particular hidden state. All probabilities entering an observable state will sum to 1.

In the system and method according to the invention, the number of classes of objects and an image sequence is all that must be provided in order to extract objects from an image sequence and learn their generative model (e.g., a model of how the observed data could have been generated). Given this information, probabilistic inference and learning are used to compute a single set of model parameters that represent either the video sequence processed to that point or the entire video sequence. These model parameters include the mean appearance and variance of each class. The probability of each class is also determined.

The aforementioned parameters are initialized, a guess is made at the model parameters in the initial state. Typically this involves using the means and variances of the pixels in the video sequence, but other methods of initializing the data could be employed, such as using a randomly generated data set.

The model employed in one embodiment of the system and method according to the invention includes a latent image (e.g., an intermediate hidden image) and a transformation variable. More specifically, under the THMM model used in the invention, frames in the video sequence are generated from a probability model. Gaussian mixture class index (c), and translation index (t) are together the state of an HMM. Observation x is obtained by translating a latent image z by a translation indexed by l.

Once the model has been initialized, an expectation-maximization ("EM") algorithm is used to learn the one or more object class models, so that the video sequence has high marginal probability under the model. In the expectation step (the "E-Step"), the model parameters are assumed to be correct, and for an input image, probabilistic inference is used to fill in the values of the unobserved or hidden variables, e.g., the object class and appearance. In one embodiment of the invention, a Viterbi algorithm is employed for this purpose. By integrating out the hidden variable z, the model reduces to a standard HMM with state s=(c,l) and a Gaussian observation likelihood. The posterior $q(\{c,l\})$ is then approximated over all possible paths as the mixture of a small number (M) of the most likely of possible state sequences. The system and method according to the invention only allows $q(\{c,l\})$ to have a non-zero probability on M most probable paths. This reduces a number of problems that occur using forward-backward reference techniques.

In the maximization step (the "M-Step"), the model parameters are adjusted using the values of the unobserved variables calculated in the previous E-step to increase the joint probability of the observations and the filled in unobserved or hidden variables. Instead of using batch processing typically used in EM processing, the system and method according to the invention employs an on-line algorithm that passes through the data only once and which introduces new classes as the new data is observed is proposed. Frames in video typically come in bursts of a single class which means that the algorithm does not need to test all classes against all frames all of the time. More specifically, in batch processing the algorithm solves for the class mean using all frames in the image sequence. The inference and parameter optimization are iterated. In on-line EM, as used in the system and method according to the invention, the update equation for the class mean $\mu_c$ is rewritten for one extra frame and the relationship between $\mu_c^t$ and $\mu_c^{t+1}$ is established. The model parameters are updated after each input image frame so there is no need for iteration. Most of the time, the algorithm is simply inferring the transformations under only one class, and only during the possible class transition periods it evaluates all classes. This makes the algorithm's performance equivalent to a single-iteration, single-class THMM learning. The next image in the sequence is then input to the process and similarly processed in a recursive fashion computing the probabilistic inference to fill in the hidden variables and using these values to calculate the joint probability of the observations until all images of the image sequence are processed.

In view of the preceding discussion, it is clear that the generative model described herein is advantageous for use in the analysis of video and other time-series data. For example, the system and method according to the invention is useful for clustering objects and for meta data creation for stored video or real-time tracking and recognition of objects for interaction between a computer and a user. There could be applications in analysis of audio as well.

In addition to the just described benefits, other advantages of the generative model described herein will become apparent from the detailed description which follows hereinafter when taken in conjunction with the accompanying drawing figures It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

DESCRIPTION OF THE DRAWINGS

The specific features, aspects, and advantages of the generative model for layered vision will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
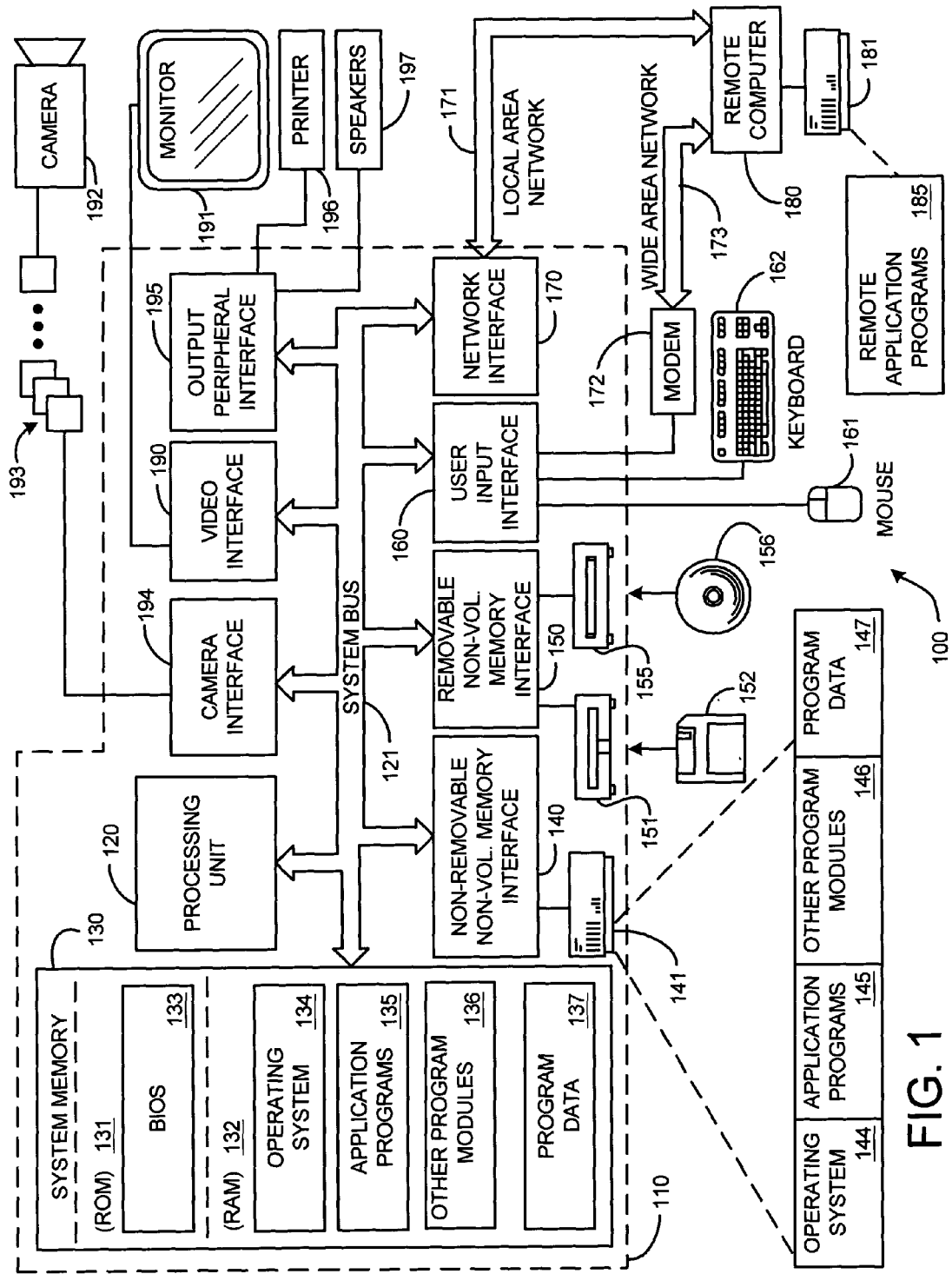
FIG. 1 is a general system diagram depicting an exemplary general-purpose computing device for learning generative models.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available physical media that can be accessed by computer 110 and includes bath volatile and nonvolatile media, removable and non-removable media. By way of example, and not limitation, computer readable media may comprise physical computer storage media. Computer storage media includes volatile and nonvolatile removable and non-removable media implemented in any physical method or technology for storage of information such as computer readable instructions, data structures, program modules or other data. Computer storage media includes physical devices such as, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras could be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194. This interface is connected to the system bus 121, thereby allowing the images 193 to be routed to and stored in the RAM 132, or any of the other aforementioned data storage devices associated with the computer 110. However, it is noted that image data can be input into the computer 110 from any of the aforementioned computer-readable media as well, without requiring the use of a camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the creation and use of a generative model according to the present invention.

2.0 A System and Method for Fast On-line Learning of Transformed Hidden Markov Models 2.1 Overview.

The system and method according to the invention tries to recognize patterns in time (e.g., finding possibly recurring scenes or objects in an image sequence), and in order to do so attempts to model the process that could have generated the pattern. It uses the possible states or classes, the probability of each of the classes being in each of the states at a given time and a state transition matrix that gives the probability of a given state given that state at a previous time. The states further may include observable states and hidden states. In such cases the observed sequence of states is probabilistically related to the hidden process. The processes are modeled using a hidden transformed Hidden Markov (THHM) model where there is an underlying hidden Markov process changing over time, and a set of observable states which are related somehow to the hidden states. The connections between the hidden states and the observable states represent the probability of generating a particular observed state given that the Markov process is in a particular hidden state. All probabilities entering an observable state will sum to 1.

In the system and method according to the invention, the number of classes of objects and an image sequence is all that must be provided in order to extract objects from an image sequence and learn their generative model (e.g., a model of how the observed data could have been generated). Given this information, probabilistic inference and learning are used to compute a single set of model parameters that represent the entire video sequence. These model parameters include the mean appearance and variance of each class. The probability of each class is also determined.

The aforementioned parameters are initialized and a guess is made at the model parameters in the initial state. Typically this involves using the means and variances of the pixels in the video sequence, but other methods of initializing the data could be employed, such as using a randomly generated data set.

The model employed in one embodiment of the system and method according to the invention includes a latent image (e.g., an intermediate hidden image) and a transformation variable. More specifically, under the THMM model, frames in the video sequence are generated from a probability model. Gaussian mixture class index (c), and translation index (l) are together the state of an HMM. Observation x is obtained by translating a latent image z by a translation indexed by l.

Once the model has been initialized, an expectation-maximization ("EM") algorithm is used to learn the one or more object class models, so that the video sequence has high marginal probability under the model. In the expectation step (the "E-Step"), the model parameters are assumed to be correct, and for an input image, probabilistic inference is used to fill in the values of the unobserved or hidden variables, e.g., the object class, transformation and appearance. In one embodiment of the invention, a Viterbi algorithm is employed for this purpose. By integrating out the hidden variable z, the model reduces to a standard HMM with state s=(c,l) and a Gaussian observation likelihood. The posterior q({c,l}) is then approximated over all possible paths as the mixture of a small number (M) of the most likely of possible state sequences. The system and method according to the invention only allows q({c,l}) to have a non-zero probability on M most probable paths. This reduces a number of problems that occur using forward-backward reference techniques.

In the maximization step (the "M-Step"), the model parameters are adjusted using the values of the unobserved variables calculated in the previous E-step to increase the joint probability of the observations and the filled in unobserved or hidden variables. Instead of using batch processing typically used in EM processing, the system and method according to the invention employs an on-line algorithm that passes through the data only once and which introduces new classes as the new data is observed is proposed. Frames in video typically come in bursts of a single class which means that the algorithm does not need to test all classes against all frames all of the time. More specifically, in batch processing the algorithm solves for the class mean using all frames in the image sequence. The inference and parameter optimization are iterated. In on-line EM, as used in the system and method according to the invention, the update equation for the class mean $\mu_c$ is rewritten for one extra frame and the relationship between $\mu_c^t$ and $\mu_c^{t+1}$ is established. The model parameters are updated after each input image frame so there is no need for iteration. Most of the time, the algorithm is simply inferring the transformations under only one class, and only during the possible class transition periods it evaluates all classes. This makes the algorithm's performance equivalent to a single-iteration, single-class THMM learning. The next image in the sequence is then input to the process and similarly processed in a recursive fashion computing the probabilistic inference to fill in the hidden variables and using these values to calculate the joint probability of the observations until all images of the image sequence are processed.

The system architecture and the method according to the present invention are described in detail in the following sections. A discussion regarding variational approximation methods according to the invention for dramatically accelerating the learning of the objects follow.

Figure 2:
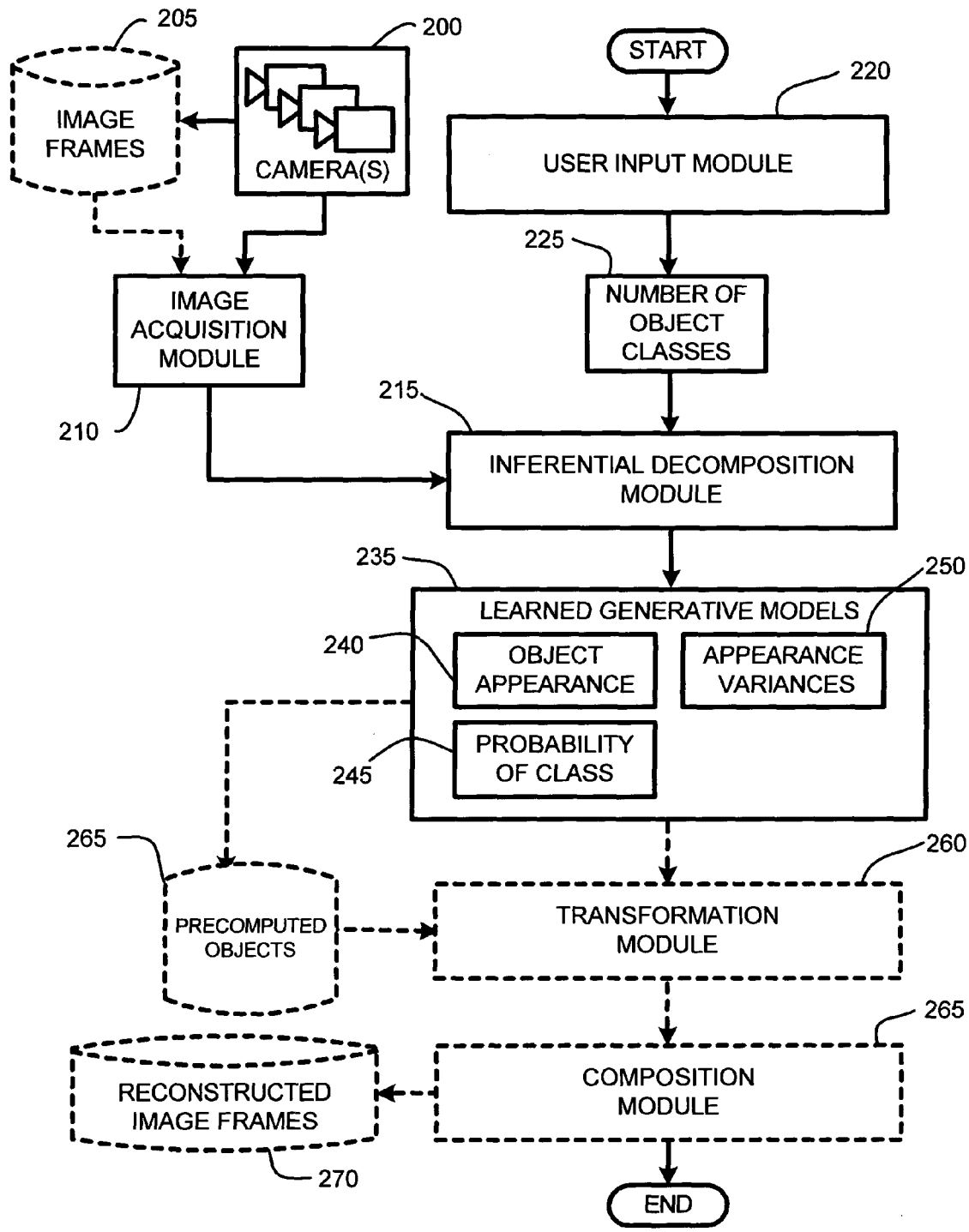
FIG. 2 illustrates an exemplary architectural diagram showing exemplary program modules for a generative model from a set of images in one embodiment of the system and method according to the invention.

2.2 System Architecture:

The system diagram of FIG. 2 illustrates the interrelationships between program modules for learning objects or classes in an image sequence. It should be noted that the boxes and interconnections between boxes that are represented by broken or dashed lines in FIG. 2 represent alternate embodiments described herein, and that any or all of these alternate embodiments, may be used in combination with other alternate embodiments that are described throughout this document.

In particular, as illustrated by FIG. 2, the system and method according to the invention learns generative models throughout the image sequence. To begin, one or more cameras 200 provides one or more sequential image frames 205 directly to an image acquisition module 210. Alternately, the image frames 205 are first stored to an image database or file on a computer readable medium, which in turn provides the images to the image acquisition 210 module when processing of the image sequence is desired.

In either case, the image acquisition module 210 then provides the image frames 205 to an inferential decomposition module 215 that employs a Viterbi algorithm in its processing. Given the number of object classes 230, and an image frame in the sequence of image frames 205, the inferential decomposition module 215 then begins a recursive generalized expectation maximization process for learning a generative model 235 from the input image frames 205 for each object class. In general, as described in greater detail below, this recursive generalized expectation maximization process operates by using a variational probabilistic inference to infer object class, including mean and variance pixel intensities.

In general, the generalized expectation maximization process performed by the inferential decomposition module 215 serves to decompose the input image frames into individual components consisting of object appearances. In combination, these components form a unique learned generative model 235 for each object class (mean and variance as well as the probabilities of each class).

The object appearance 240 is basically a probabilistic 2-dimensional appearance map representing an object identified throughout the image sequence. In other words, the object appearance is basically the mean appearance of an object identified in the image frames 205 as belonging to a given object class.

In one embodiment, once the generative model 235 has been learned for each object class, the generative models are provided to a transformation model where each object is transformed for each image frame, as described in detail below, and provided to a composition module 265 for use in reconstructing the decomposed image frames. In one embodiment, one or more of these stored generative models are then provided to the transformation module 260 as with the newly generative models 235. In another embodiment, the reconstructed image frames are stored to a file or database 270 for later viewing or processing.

In another embodiment, one or more learned generative models 235 are stored in a file or database 265. As described below, pre-computed stored generative models 265 may be used for a number of purposes. For example, given an input image sequence of a person walking across a field, with a person object and a background object being learned for the generative model 235, additional objects can be added to a reconstructed image created by the composition module 265. For example, assuming that a generative model representing a flying bird has been previously inferred and stored to a file or database 265, that single generative model of a flying bird can be used to add one or more flying birds to the scene of the person walking across the field. Further, as described in detail below, any or all of these objects can be composed in any desired order, such as, for example, with birds flying either in front of or behind the person, or both in front of and behind the person in a composited image sequence.

2.3 System Operation:

The program modules described in Section 2.2 with reference to FIG. 2, and, are employed for learning generative models in an image sequence. This process is depicted in the flow diagram of FIG. 3. It should be noted that the boxes and interconnections between boxes that are represented by broken or dashed lines in FIG. 3 represent alternate embodiments of the present invention, and that any or all of these alternate embodiments, as described below, may be used in combination.

Figure 3:
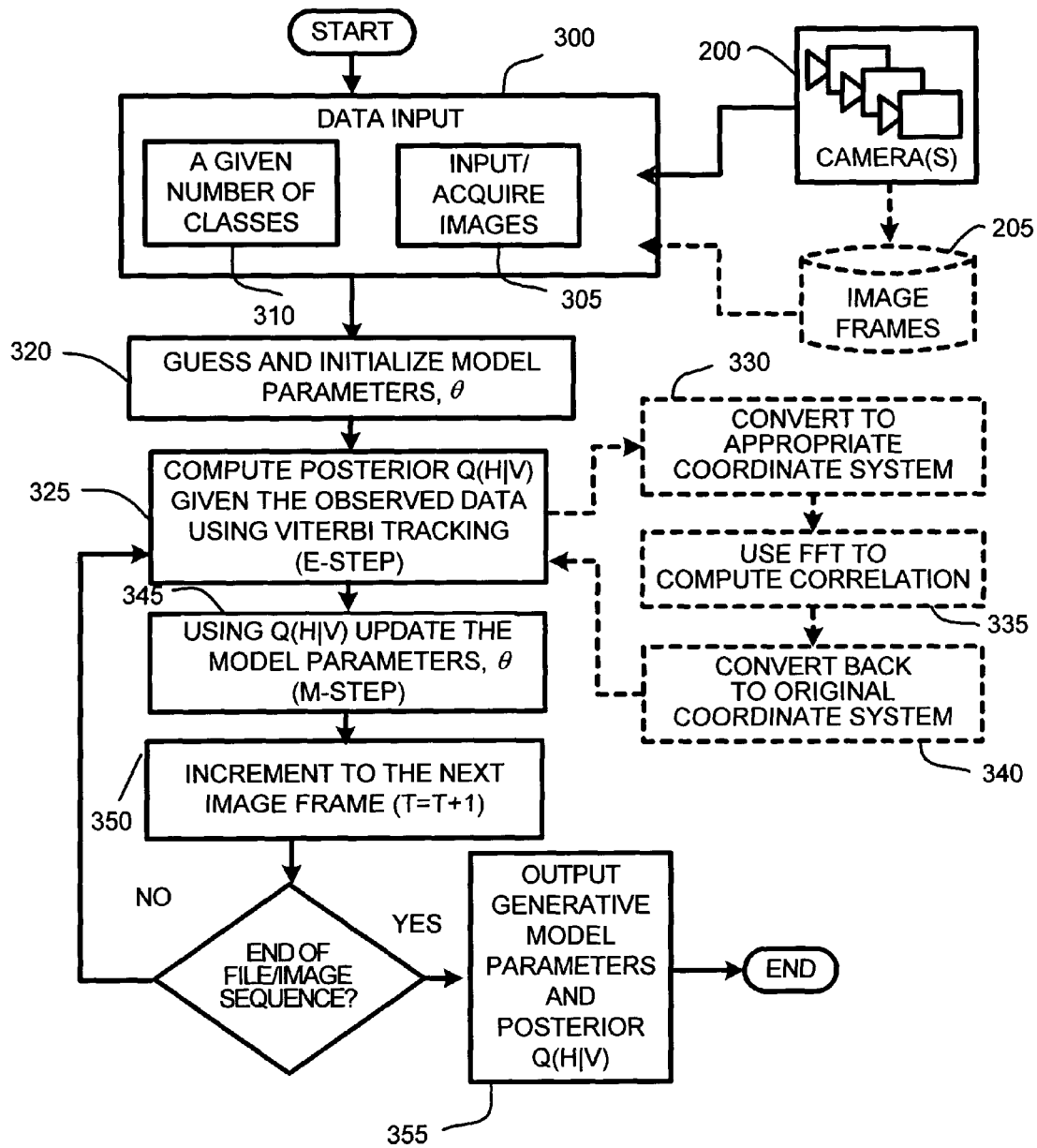
FIG. 3 illustrates an exemplary system flow diagram for automatically learning a generative model for decomposing image frames into one or more object classes.
Figure 5:
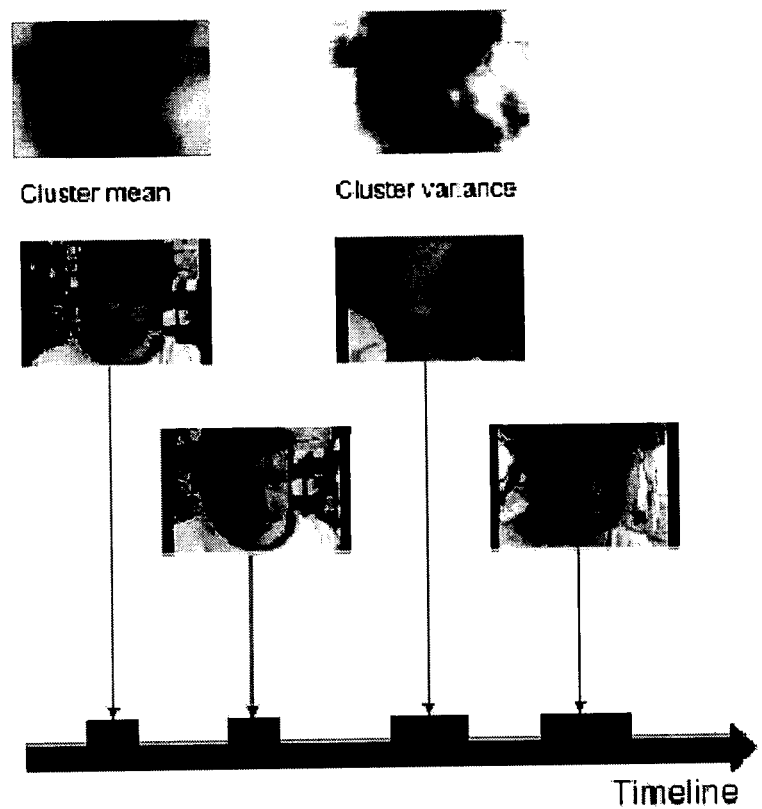
FIG. 5 depicts the application of THMM for clustering a 20-minute long vacation video. The mean (best seen in color) and the variance of one of the 43 clusters in the Gaussian mixture are shown in the upper row. The central part of the mean contains and outline of a baby's face in skin color. For this region, the variance is low, while the various backgrounds against which the face appeared are modeled with high variance around the face. Lengths and positions of four video segments found in the first 9 minutes of the video are illustrated on the timeline. These 9 minutes were captured over the period of several days.

Referring now to FIG. 3 in combination with FIG. 2, the process can be generally described as a system and method for automatically learning generative models representing object classes from a sequence of one or more images.

In general, as illustrated by FIG. 3, the system and method for learning generative models begins by inputting data 300 for processing. In particular, a sequence of one or more image frames 205, from either a camera 200 or a file or database of image frames are input 305 for processing. In addition, the desired number of object classes 310 are also input for processing.

Given the image sequence 205 and the number of object classes 310, a set of model parameters that represent the image sequence processed to that point is computed as a generative model of the image sequence. As described below, computation of the generative model is accomplished using a variational generalized expectation maximization process.

Figure 4:
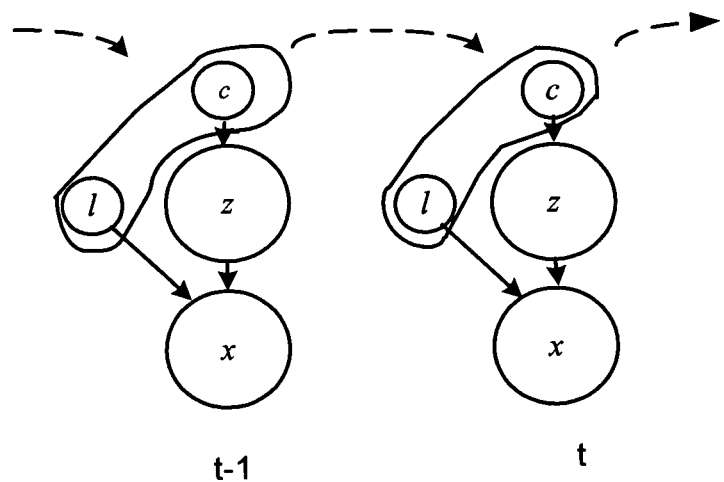
FIG. 4 illustrates the Transformed Hidden Markov Model employed in the system and method according to the invention. Pair c-z is Gaussian mixture. Gaussian mixture class index (c), and translation index (l) are together the state of an HMM. Observation x is obtained by translating a latent image z by a translation indexed by l.

In particular, the first step after the initial data input 300 involves initializing model parameters 320 that include prior probabilities of the object classes, means and variances of the object class appearance maps, and observation noise variances. The model employed in one embodiment of the system and method according to the invention includes a latent image (e.g., an intermediate hidden image) and a transformation variable. More specifically, under the THMM model, frames in the video sequence are generated from a probability model. Gaussian mixture class index (c), and translation index (l) are together the state of an HMM, as shown in FIG. 4. Observation x is obtained by translating a latent image z by a translation indexed by l. These parameters are either initialized 320 randomly, or by simply using pixel means and variances for each image frame. Other methods of initializing the model could be used, however.

Once these parameters have been initialized 320 the generalized expectation-maximization process begins. In general, as described above, first, an expectation step ("E-Step") is used to adjust variational parameters of the posterior Q(H|V) 325 in order to maximize the lower bound on the log-likelihood of an image frame with respect to Q(H|V). The system employs a Viterbi algorithm in this processing. The system can also use variational approximations and inference using fast Fourier transforms for increasing the speed of learning the generative models. Specifically, in one embodiment, in adjusting the variational parameters for the E-Step, the parameters are first converted to an appropriate coordinate system 330, if necessary, so that transforms can be accomplished using a simple shift operation. The coordinate systems are either rectangular, or polar, and depend upon the particular variable being analyzed.

In particular, as described above, given transforms of scale, rotation, and x-y translations for a particular object class, translations are simply shift operations in a Cartesian coordinate system, while rotation and scale become shift operations in a log-polar coordinate system. Further, converting to a coordinate system appropriate for shift operations 330 allows a FFT to be used for computing the correlation 335 for all transforms. Next, the variational parameters are simply converted back into the original coordinate system (340). The results of these steps, e.g., converting to an appropriate coordinate system 330, computing the FFT's 335, and converting back to the original coordinate system 340, allows for rapid inference of the variational parameters during the E-Step 325 of the generalized expectation-maximization process described above. In one embodiment of the system and method according to the invention, FFT processing precedes the Viterbi processing. FFT processing is used to quickly process the data which is used as an input for Viterbi.

Next, the model, the model parameters are adjusted in the maximization step ("M-Step") 345. In particular, the M-Step serves to adjust model parameters 345 in order to maximize the lower bound on the log-likelihood of the image frame. In the maximization step (the "M-Step"), the model parameters are adjusted using the values of the unobserved variables calculated in the previous E-step to increase the joint probability of the observations and the filled in unobserved or hidden variables. Instead of using batch processing typically used in EM processing, the system and method according to the invention employs an on-line algorithm that passes through the data only once and which introduces new classes as the new data is observed is proposed. Frames in video typically come in bursts of a single class which means that the algorithm does not need to test all classes against all frames all of the time. More specifically, in batch processing the algorithm solves for the class mean using all frames in the image sequence. The inference and parameter optimization are iterated. In on-line EM, as used in the system and method according to the invention, the update equation for the class mean $\mu_c$ is rewritten for one extra frame and the relationship between $\mu_c^t$ and $\mu_c^{t+1}$ is established. The model parameters are updated after each input image frame so there is no need for iteration. Most of the time, the algorithm is simply inferring the transformations under only one class, and only during the possible class transition periods it evaluates all classes. This makes the algorithm's performance equivalent to a single-iteration, single-class THMM learning. In one embodiment, after processing an image, the system stores the parameters of the updated generative model. Only after the last video frame in the sequence is processed the system puts out parameters of learned generative model.

At this point, a check for end of file or end of the image sequence is performed. If the end of the image sequence has not yet been achieved, then the E-Step 320 and the M-Step 345 are repeated, using the previously computed values as inputs for each subsequent iteration, as described above. Once the end of file has been reached, the learned parameters are output as a generative model 355. The system stops the processing once the last video frame in the sequence is processed. Convergence is guaranteed because the system processes the sequences with finite number of video frames.

The system architecture and process according to the invention having been generally described, the following paragraphs are devoted to the details of the aforementioned system and process.

2.4 Learning THMM Using a Variational Approximation and the M-paths Viterbi Algorithm.

The THHM model employed in the present invention employs a Viterbi algorithm in order to increase the speed of the required computations. The Viterbi algorithm for maximizing joint distributions of states and observations is many times faster than a forward-backward algorithm. The Viterbi algorithm utilizes a trellis. A trellis is an extension of a state diagram that shows the passage of time. Every branch between two states represents a possible state change. So, as proposed in [4], the system and method according to the invention employs an M-paths Viterbi algorithm that keeps track of more than one path in the trellis.

Under the THMM model, frames in the video sequence are generated from a probability model, as shown in FIG. 4 wherein pair c-z is a Gaussian mixture. Gaussian mixture class index (c), and translation index (l) are together the state of an HMM. Observation x is obtained by translating a latent image z by a translation indexed by l. As shown in FIG. 4, the probability density of the vector of pixel values z for a latent image corresponding to the cluster c is $$p(z|c)=N(z;\mu_c,\Phi_c) \qquad (1)$$

where $\mu_c$ is the mean of the latent image z, and $\Phi_c$ is a diagonal covariance matrix that specifies the variability of each pixel in the latent image. The probability density of the vector of pixel values x for the image corresponding to transformation l and latent image z is $$p(x|l,z) = N(x; \Gamma_l z, \psi), \quad (2)$$

where $\psi$ is a diagonal covariance matrix that specifies the noise on the observed pixels. The joint likelihood of a single video frame x and latent image z, given the state of the Markov chain $s \equiv (c,l)$, is $$p(x,z|s=(c,l)) = N(x; \Gamma_l z, \psi) N(z; \mu_c, \Phi_c) \quad (3)$$

Note that the distribution over z can be integrated out in the closed form $$p(x|s=(c,l)) = N(x; \Gamma_l \mu_c, \Gamma_l \Phi_c \Gamma_l' + \psi), \quad (4)$$

and then from (3) and (4)

$$p(z|x,c,l) = N(z; \Omega_{cl} \Gamma_l \Psi^{-1} x_t + \Omega_{cl} \Phi_c^{-1} \mu_c, \Omega_{cl}) \quad (5)$$

where $\Omega_{cl} = (\Phi_c^{-1} + \Gamma_l' \psi \Gamma_l)^{-1}$. The joint log likelihood of a video sequence $X = \{x_t\}_{t=1, \ldots, T}$, hidden states of THMM S, and latent images Z is $$\log p(X, Z, S) = \log \pi_{cl} + \sum_{t=1}^{T} \log p(x_t, z_t | s_t) + \sum_{t=1}^{T-1} \log a_{s_t, s_{t+1}} \quad (6)$$

The initial state probabilities are depicted as $\pi_{cl}$. The statistical properties of the sequence dynamics are captured in parameters $\alpha_{s_t, s_{t+1}} = p(s_{t+1}|s_t)$. It is reasonable to assume that class index c at time t+1 depends only on class index at time t, whereas position index l depends both on previous position and class indices due to the different motion patterns of different objects in the scene. Hence, $p(l_{t+1}, c_{t+1}|l_t, c_t) = p(l_{t+1}|l_t, c_t) p(c_{t+1}|c_t)$. Furthermore, the transformation transition coefficients can be heavily constrained by choosing the small motion, or the motion in certain direction for given class.

Instead of maximizing log-likelihood of the data, an auxiliary probability density function is introduced over hidden variables, q(l,c,z), and using Jensen's inequality the lower bound on log-likelihood [6] is obtained.

$$\log p(X) = \quad (7)$$

$$\log \sum_{\{c,l\}} \int_z dz p(X, \{z, c, l\}) \geq \sum_{\{c,l\}} \int_z dz q(\{z, c, l\}) \log p(X, \{z, c, l\}) - \sum_{\{c,l\}} \int_z dz q(\{z, c, l\}) \log q(\{z, c, l\})$$

The second term in the lower bound is the entropy of posterior q and it does not depend on the model parameters. The notation $\{c,l\}$ depicts the series of all transformation indices $\{c_t, l_t\}, t=1, \ldots, T$. It is implicitly understood that the variational posterior q depends on X. Distribution q can be factored as $q(\{c,l\}) q(\{z\}|\{c,l\})$, where the first term corresponds to the distribution over states of an HMM. Therefore, the lower bound on log likelihood is $$F = \sum_{\{c,l\}} \int_{\{z\}} dz q(\{c, l\}) q(\{z\} | \{c, l\}) \times \left[ \log \pi_{cl} + \sum_{t=1}^{T} \log p(x_t, z_t | c_t, l_t) + \sum_{t=1}^{T-1} \log p(c_{t+1}, c_t) \log(l_{t+1} | l_t, c_t) \right] \quad (8)$$

Learning can now be defined as optimizing the upper bound with respect to the parameters of the posterior q and the model parameters.

2.4.1. Probabilistic Inference (Posterior Optimization-the E-Step).

By integrating out the hidden variable z, the model reduces to a standard HMM with state $s=(c,l)$ and the Gaussian observation likelihood given by Eq. (4). Then the posterior $q(\{c,l\})$ can be computed exactly using the forward-backward algorithm as in [3]. However, as mentioned previously, the cost of this operation is not justified as most of the $(CMN)^T$ state paths in the trellis actually have very low probability. Furthermore, the range of the observation likelihood and the size of the state space cause significant problems with numerical precision for sequences longer than a few seconds, even when the path strengths are stored in the log domain. In the system and method according to the invention, the posterior $q(\{c,l\})$ is approximated over all possible paths as the mixture of a small number (M) of possible state sequences $$q(\{c, l\}) = \sum_{m=1}^{M} r_m \delta\left(\{c, l\} - \{\hat{c}, \hat{l}\}^{(m)}\right), \text{ where } \sum_{m=1}^{M} r_m = 1. \quad (9)$$

One can easily show that to optimize the bound F with respect to the M paths and their strength, it is necessary to find the M best paths in the trellis and set $r_m$ parameters proportional to their likelihoods.

For a given state-space sequence, the distribution $q(z_t|c_t, l_t)$ over the latent image at each time step t can be performed exactly as in Eq. (5) for all M paths.

2.4.2. Parameter Optimization

Defining $\mu_{c_1 c_2} = p(c_{t+1}=c_2|c_t=c_1)$, and $v_{l_1 l_2}^{c_1} = p(l_{t+1}=l_2|l_1=l_1, c_t=c_1)$, and finding the constrained derivatives of the bound F $$0 = \frac{\partial}{\partial u_{c_1 c_2}} \left[ \sum_{\{c,l\}} \int_{\{z\}} dz q(\{z\} | \{c, l\}) \times q(\{c, l\}) \sum_{t=1}^{T-1} u_{c_t c_{t+1}} - \lambda \left( 1 - \sum_{c_t=1}^{C} u_{c_t c_{t+1}} \right) \right] \quad (10)$$

gives the optimal transition coefficients assuming the distribution $q(\{x,l\})$)

$$\tilde{u}_{c_1 c_2} = \frac{\sum_{t=1}^{T-1} q(c_t = c_1, c_{t+1} = c_2)}{\sum_{t=1}^{T-1} q(c_t = c_1)} = \frac{\sum_{t=1}^{T-1} \sum_{m=1}^{M} r_m \delta(\hat{c}_t^{(m)} - c_1) \delta(\hat{c}_{t+1}^{(m)} - c_2)}{\sum_{t=1}^{T-1} \sum_{m=1}^{M} r_m \delta(\hat{c}_t^{(m)} - c_1)} \quad (11)$$

and $$\tilde{v}_{l_1 l_2}^{c_1} = \frac{\sum_{t=1}^{T-1} q(l_t = l_1, l_{t+1} = l_2, c_t = c_1)}{\sum_{t=1}^{T-1} q(l_t = l_1, c_t = c_1)} = \quad (12)$$

$$\frac{\sum_{t=1}^{T-1} \sum_{m=1}^{M} r_m \delta(\hat{l}_t^{(m)} - l_1) \delta(\hat{l}_{t+1}^{(m)} - l_2) \delta(\hat{c}_t^{(m)} - c_1)}{\sum_{t=1}^{T-1} \sum_{m=1}^{M} r_m \delta(\hat{l}_t^{(m)} - l_1) \delta(\hat{c}_t^{(m)} - c_1)}$$

Intuitively, one expects the matrix of coefficients $\tilde{u}_{c_1 c_2}$ to have large diagonal elements, since the new frame is favored to remain in the same cluster as the previous. Also, it is possible to severely constrain transformation transition coefficients $\tilde{v}_{l_1 l_2}^{c_1}$ and in that fashion set the motion prior for the class, for example, favoring the small motion or the motion in one direction.

Finding the derivatives with respect to the cluster means yields, $$\sum_{t=1}^{T-1} \sum_{\{l,c\}: c_t = k} q(\{c, l\}) \int_{z_t} dz_t q(\{z_t\} \mid \{c, l\}) \times \left(-\frac{1}{2} \phi_k^{-1} (z_t - \mu_k)\right) = 0 \quad (13)$$

Due to the nature of the Markov chain, given the pair $(c_t, l_t)$, $z_t$ does not depend on any other $(c, l)$, nor on any other x apart from $x_t$. Therefore, for E, the expectation of random variable (e.g., $z_t$), $E(z_t|X, \{c, l\}) = E(z_t|x_t, c_t, l_t)$, where $E(z_t|x_t, c_t, l_t)$ is given by (5), and thus, $$\Phi_k^{-1} \sum_{t=1}^{T} \sum_{l_t} q(c_t = k, l_t) E[z \mid x_t, c_t = k, l_t] = \Phi_k^{-1} \sum_{t} q(c_t = k) \mu_k. \quad (14)$$

Subsequently, if the posterior is known, the means $\mu_k$ can be set in the batch EM update, $$\tilde{\mu}_k = \frac{\sum_{t=1}^{T} \sum_{l_t} q(c_t = k, l_t) E[z_t \mid x_t, c_t = k, l_t]}{\sum_{t=1}^{T} q(c_t = k)} \quad (15)$$

where the summation in $\Sigma_{l_t}$ is only over the paths that pass through class k at time t. Even though the number of transformations is equal to the number of pixels the search only applied to the transformations that yield a non-zero term $q(c_t = k, l_t)$, which in turn is computed by simply looking up those of M paths in q that pass through class k at time t $$q(c_t = k, l_t) = \sum_{m=1}^{M} r_m \delta(\hat{c}_t^{(m)} - k) \delta(\hat{l}_t^{(m)} - l_t), \quad (16)$$

and $$q(c_t = k) = \sum_{m=1}^{M} r_m \delta(\hat{c}_t^{(m)} - k) \quad (17)$$

Similarly, covariance matrix update is $$\tilde{\Phi}_k = \frac{1}{\sum_{t=1}^{T} q(c_t = k)} \sum_{t=1}^{T} \sum_{l_t} q(c_t = k, l_t) \times [ \quad (18)$$

$$(E[z_t \mid x_t, c_t = k, l_t] - \mu_k) \circ (E[z_t \mid x_t, c_t = k, l_t] - \mu_k) + \Omega_{ct}]$$

The variational approximation of the posterior distribution over the states of an HMM with M best sequences significantly reduces the computational burden in EM update.

2.4.3 Recursive. On-line EM (The M-Step).

Figure 6:
FIG. 6 shows three frames from a Walk sequence, corresponding to the beginning, middle part, and the end of the sequence.

While improving somewhat the computational efficiency and solving the problems that the exact learning algorithm of [3] had with the machine precision, the M-best paths learning described in the previous section still suffers from two drawbacks: a) the need to preset the number of classes C, and b) the need to iterate. For a typical 20-minute sequence, the needed number of classes C can range anywhere from five to fifty (see FIG. 6 and FIG. 7), and more extreme values are possible, as well. While the number of iterations needed to converge also depends slightly on the number of classes, it is typically sufficient to run the algorithm for ten or twenty iterations. The computational cost is proportional both to the number of iterations and the number of classes, but the structure of realistic video allows development of more efficient algorithms. Frames in video typically come in bursts of a single class which in principle means that the algorithm does not need to test all classes against all frames all the time, and also that there is an abundance of data to learn the class model from, thus opening room for an on-line learning algorithm that adapts to the new data and slowly forgets the old.

The system and method according to the invention employs an on-line algorithm that passes through the data only once and which introduces new classes as the new data is observed is proposed. Most of the time, the algorithm is simply inferring the transformations under only one class, and only during the possible class transition periods it evaluates all classes. This makes the algorithm's performance equivalent to a single-iteration, single-class THMM learning, which for the typical numbers given above for a twenty-minute sequence leads to an improvement of a factor 300 against ten iterations of the batch learning of a 30-class THMM.

To derive the on-line learning algorithm, Eq. (14) is reconsidered and the following sufficient statistics, S and R, are defined $$S_{k,T}\Phi_k^{-1}\sum_{t=1}^{T}\sum_{l_t} q(c_t = k, l_t)E[z \mid x_t, c_t = k, l_t] \qquad (19)$$

and $$R_{k,T}\Phi_k^{-1}\sum_{t=1}^{T} q(c_t = k). \qquad (20)$$

Then, batch update of $\mu_k$ using T data samples is $\mu_k^{(T)} = R_{k,T}^{-1}S_{k,T}$, as in (15). If one rewrites (14) for T+1 data samples $$S_{k,T} + \Phi_k^{-1}\sum_{l_{T+1}} q(c_{T+1}, l_{T+1})E[z \mid x_{T+1}, c_{T+1}, l_{T+1}] = \qquad (21)$$

$$R_{k,T}\mu_k + \Phi_k^{-1}q(c_{T+1} = k)\mu_k$$

Multiplying (21) from the left with $R_T^{-1}$ $$\mu_k^{(T)} + R_{k,T}^{-1}\Phi_k^{-1}\sum_{l_{T+1}} q(c_{T+1}, l_{T+1})E[z \mid x_{T+1}, c_{T+1}, l_{T+1}] = \qquad (22)$$

$$[I + R_{k,T}^{-1}\Phi_k^{-1}q(c_{T+1} = k)]\mu_k^{(T+1)},$$

and assuming the term in the square brackets on the right hand side (RHS) is close to 1, and using the matrix equivalents of $$\frac{1}{1+x} \approx 1 - x \text{ and } \frac{x}{1+x} \approx x$$

$$\mu_k^{(T+1)} = [I - R_{k,T}^{-1}\Phi_k^{-1}q(c_{T+1} = k)]\mu_k^{(T)} + \qquad (23)$$

$$R_{k,T}^{-1}\Phi_k^{-1}\sum_{l_{T+1}} q(c_{T+1}, l_{T+1})E[z \mid x_{T+1}, c_{T+1}, l_{T+1}]$$

The statistics $R_{k,T}$ as it is defined is increasing and ultimately diverges to infinity. It could be rewritten in terms of its time average. If the short-time average is defined as $$\tilde{R}_{k,T,\Delta T}\frac{1}{\Delta T}\sum_{t=T-\Delta T+1}^{T}\Phi_k^{-1}q(c_{T+1} = k), \qquad (24)$$

then $$R_{k,T} = \frac{T}{T}\sum_{t=1}^{T}\Phi_k^{-1}q(c_{T+1} = k) = T\tilde{R}_{k,T,T} = \frac{1}{\alpha}\tilde{R}_{k,T,T} \qquad (25)$$

where $$\alpha = \frac{1}{T}$$

is defined to be the learning rate. By taking $$\alpha = \frac{1}{\Delta T}$$

instead, we perform learning with forgetting. It is not difficult to prove using the definition that $\tilde{R}_{k,T,\Delta T}$ is updated using the recursion $$\tilde{R}_{k,T,\Delta T} = (1-\alpha)\tilde{R}_{k,T-1,\Delta T} + \alpha\Phi_k^{-1}q(c_T = k) \qquad (26)$$

Note that this update is different than the update based on taking a step in the direction of the bound or likelihood gradient, as suggested in [7]. The gradient-based approach produces small steps for unlikely classes, thus rendering learning of multi-class models slow. This does not happen in the batch learning, due to the normalization with the total responsibility of the class k in the video. Thus, even if the class was initialized far from the data, after the very first iteration of EM it will jump close to it, as the update becomes an average of the data points. The gradient-based on-line learning, on the other hand, due to the small value of the posterior for each data point, moves the parameters very slowly. In the update of the system and method according to the invention, the additional quantity $\tilde{R}_{k,T,\Delta T}$ plays the role of the average responsibility of the class k in the previously seen frames. This quantity is also tracked through time in addition to the model parameters, and so rather than making a step scaled by the responsibility of the class, what matters in the update equation is the ratio of the class responsibility for the new data point and the average class responsibility for the previously seen points. Equation (26) is a recursive equation that links $\tilde{R}_{k,T,\Delta T}$ and the same quantity with T replaced with T−1. Class responsibility is the quantity on the very right of eq, (26) $q(c_T = k)$. $\tilde{R}_{k,T,\Delta T}$ is therefore $\tilde{R}_{k,T,\Delta T}$ for T−1 plus the contribution of $q(c_T = k)$. $\tilde{R}_{k,T,\Delta T}$ for T−1 is in turn $\tilde{R}_{k,T,\Delta T}$ for T−2 plus contribution of $q(c_{T-1} = k)$. This repeating process says that $\tilde{R}_{k,T,\Delta T}$ depends on class responsibility $q(c_T = k)$ in such a way that it is actually an average of class responsibility $q(c_T = k)$ over all previously seen frames.

Substituting (25) in (23) the final update rule for $\mu_k$ becomes $$\mu_k^{(T+1)} = [I - \alpha\tilde{R}_{k,T,\Delta T}^{-1}\Phi_k^{-1}q(c_{T+1} = k)]\mu_k^{(T)} + \qquad (27)$$

$$\alpha\tilde{R}_{k,T,\Delta T}^{-1}\Phi_k^{-1}\sum_{l_{T+1}} q(c_{T+1}, l_{T+1})E[z \mid x_{T+1}, c_{T+1}, l_{T+1}]$$

where the change of $\tilde{R}_{k,T,\Delta T}$ is governed by (26). Note that setting $\alpha = 1/T$ the same update is achieved as in Eq. (15), when the posterior is fixed and exact. In on-line learning $\Delta T$ is set to be smaller, and also the posterior is allowed to change. In experiments employing one embodiment of the system and method according to the invention, $\alpha$ was set to 0.01, thus updating parameters using only approximately previous 100 data samples (frames).

Note that in Eq. (26) the average class responsibility is combined with the current class variability model (by keeping $\Phi_k^{-1}$). In batch learning, since the covariance matrix is assumed fixed in one iteration, it can be divided out of the update equation (14) for the mean. However, since the parameters are changed through the time, including $\Phi_k^{-1}$ in (26) helps refine parts of the class mean at different speeds depending on the uncertainty.

To deal with the introduction of the new classes in the video, one observes first of all that the problem is ill-posed, i.e., it needs to be constrained. For example, model selection in on-line learning is sometimes constrained by specifying the prior on the model parameters [10]. Since the goal is data summarization, the class number selection is constrained by specifying the lowest allowable data likelihood. Such constraint simply states that all data needs to be explained reasonably well (with the likelihood above some threshold), while the classes should be introduced as rarely as possible. The temporal structure in the THMM and the structure of a realistic video (alternating bursts of frames from each class) suggest that if the likelihood of the current frame under the class associated with the previous frame is reasonably high, there is no need to evaluate the likelihood under the previous classes, as the current class provides a good model. So, two thresholds on the likelihood $\gamma_1 > \gamma_2$ are used. When the log-likelihood of the observed frame under the class from the previous frame is above $\gamma_1$, it is classified as belonging to the same class. When this likelihood is smaller than $\gamma_1$, the full posterior is computed and the likelihood of the data re-estimated, leading often to classifying the frame as belonging to some other, previously seen class. However, if the data likelihood under the full model is still lower than $\gamma_2$, a new class is introduced and initialized to the problematic frame. The aforementioned paragraphs relate to process action 345 of FIG. 3 and explain how the model parameters θ are being updated. For current image frame, the system does not update all model parameters θ, but only the small subset of the model parameters (typically only one class). The above discussion says that there are three scenarios. These are: 1) For the current frame the subset of θ that is being updated is the same as the subset of θ that was updated for the previous image frame. This is the most common case—the current frame is classified to be in the same cluster (class) as the previous frame. 2) The subset of θ that is being updated differs from the subset of θ that was updated for the previous frame. That means that the current frame is classified to the class different than the previous frame. 3) Model parameters θ are enlarged by the new class (e.g., θ were model parameters for 10 classes and now 11th class is being added). That means that there was a "birth" of a new class, model parameters θ are enhanced by this new class. Current frame is classified to the class that was just born. This is similar to stability-plasticity dilemma of Grossber's ART [8], whose unsupervised version iteratively clusters data, and introduces a new cluster if none of the existing clusters can explain the new sample well. This approach guarantees that the likelihood of the data will be limited from below, since during the learning the likelihood of the current frame never drops below some threshold, and the subsequent possible drop in the likelihood due to the model update is limited by the slow learning rate. However, due to the sensitivity of the number of introduced classes to the threshold $\gamma_2$, it is possible for the single-pass learning algorithm to introduce several classes modeling similar frames. This can be detected without looking back at the data, by finding the expected likelihood of the frames from one class under the probability model of the other, $$L_{1,2} = \lim_{N \to \infty} \frac{1}{N} \sum_{n=1}^{N} \log p(y_n | c_1) = E_{\mu_2, \Phi_2}[\log p(y_n | \mu_1, \Phi_1)] = \quad (28)$$

-continued
$$E_{\mu_2, \Phi_2}\left[\frac{1}{2}\log\left|\frac{\Phi_1}{2\pi}\right|\left|\frac{1}{2}(y_n - \mu_1)'\Phi_1^{-1}(y_n - \mu_1)\right|\right] =$$
$$-\frac{1}{2}\log\left|\frac{\Phi_1}{2\pi}\right| - \frac{1}{2}tr(\Phi_1^{-1}\Phi_2) - \frac{1}{2}(\mu_2 - \mu_1)'\Phi_1^{-1}(\mu_2 - \mu_1)$$

To achieve a more compact representation, class 1 and 2 in this example can be merged into one when both $L_{1,2}$ and $L_{2,1}$ are larger than the likelihood level required in the video summary. The Gaussians for two classes are merged into one in a straight-forward manner.

3.0 Experimental Results of Some Exemplary Working Embodiments

The following paragraphs describe some of the exemplary applications and results of some working embodiments of the system and method according to the invention.

3.1 Extracting Objects Using Motion Priors

In the first example of object extraction using the system and method according to the invention, object extraction from a scene was demonstrated by setting motion priors in coefficients $a_{s_t, s_{t+1}} = u_{c_1 c_2} \cdot v_{l_1 l_2}^{c_1}$. The difference between two consecutive transformation indices $l_t = l_1$ and $l_{t+1} = l_2$ corresponds to the inter-frame motion. The direction or the intensity of the motion for class $c_1$ can be constrained by setting appropriate elements in $v_{l_1 l_2}^{c_1}$ to zero. The use of motion templates for extracting the background and two objects that move in the different directions was demonstrated.

Figure 7:
FIG. 7 depicts the means and variances for three classes learned using a variational THMM for the Walk sequence. For variances, black implies very low variance and white very high variance. First column corresponds to learned background, second to the object moving to the right, and third to the object moving to the left.
Figure 8:
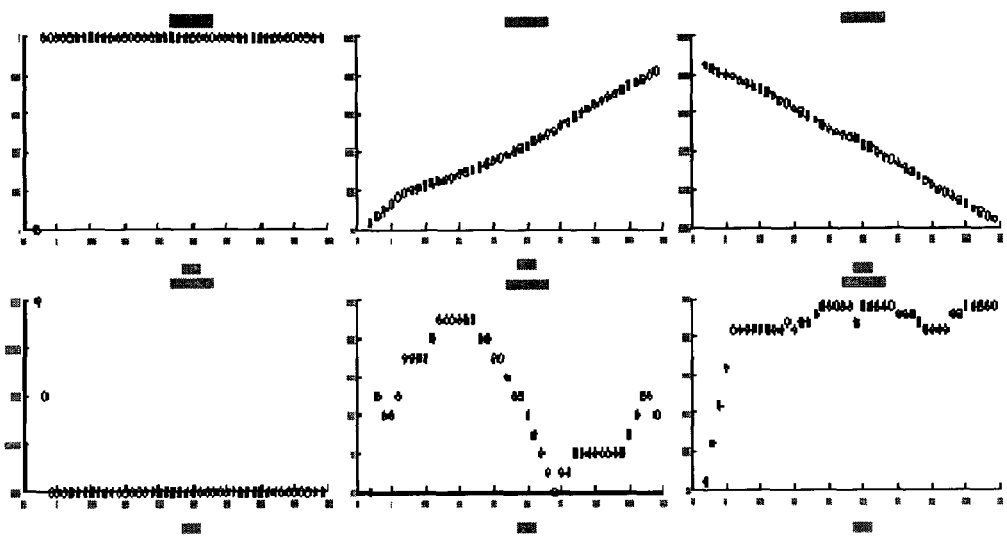
FIG. 8 shows the most likely object position for the three clusters in the 44-frame long 240×320 Walk sequence. Translations are defined as being wrapped around the image boundaries, therefore the downward shift of 239 corresponds to the upward shift of 1. The upper row represents tracking of the horizontal coordinate, while the lower row represents the tracking of the vertical coordinate. Class 2 and 3 slightly oscillate in the vertical direction, hence the detected displacement of a few pixels.

A THMM was trained on a 44 frames long 320×240 Walk sequence (FIG. 6), using M-paths batch learning described in Section 2. Training was performed at the rate of 3 fps, and it took 8 iterations of EM algorithm to obtain results in FIG. 7. The model was trained using a three-component mixture of Gaussians, and the motion priors for each of the components was set. One of the components was allowed horizontal and vertical shifts of up to one pixel. Second and third components were allowed horizontal shifts of no less than two and no more than eight pixels to the left and right, respectively. The algorithm was able to pull out the two objects and the back-ground scene into three classes (FIG. 7). Without motion priors, both TMG and THMM in its approximate or exact forms, only learn the classes similar to the first class in FIG. 7 (the background image), and are never able to track and learn the two people. The motion priors, however, help set the position inference on the right track (FIG. 8), and lead to reasonable template learning results, even though the class means were initialized to random images. The effect of the temporary occlusion of the person in white shirt is reduced in the mean image (FIG. 7), due to the integration with other frames where the person was fully or partially visible. In both person appearance models, the background is suppressed and the class variance is mostly lower on the pixels belonging to the appropriate person. Despite the slight blemishes on the appearance models, for all three classes the tracking is very precise. By modeling the data as a mixture, rather than a composition of the objects, THMM is unable to learn perfect object appearance or perform good segmentation as in [11]. But, THMM can be used as an initial approximation for the layered model, and it is an order of magnitude faster. It can be also used for object tracking, and as a motion detector.

3.2 On-line, Real Time Video Clustering.

Figure 10:
FIG. 10 illustrates the summary of a 20-minute long Hawaii sequence: cluster means for 43 classes learned using on-line algorithm at 10 frames per second.

In the first example of on-line real-time video clustering, a 20-minute long 90×60, 15 fps color Hawaii sequence was used. This typical vacation sequence was shot during the period of several days, at different locations, but with the same group of people. The THMM was trained using on-line learning, starting with the Gaussian mixture with one component. Learning and subsequent class introduction is performed at the average rate of 10 frames per second on 2.2 GHz P4. The learned cluster means are shown in FIG. 10. Commercial video shot detection software, like Microsoft's MovieMaker, usually detects only a few shots in this type of video, as most of the visual diversity in the video is caused by camera wipe rather than by camera cut. Without any clear shot cuts, the traditional software simply represents the video with thumbnails for several long video segments. These thumbnails, however, only show one frame from the shot, hiding all the other content. The clustering of the system and method of the invention provides a much richer presentation, and beyond the video segmentation task, it groups similar scenes and objects together as illustrated in FIG. 7. After the cluster-merging step, the model according to the invention consists of 43 clusters (FIG. 10).

Figure 9:
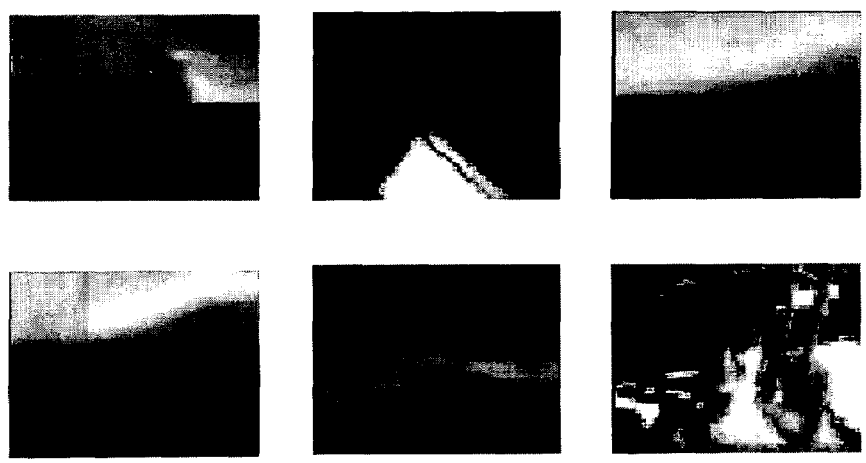
FIG. 9 illustrates an exemplary summary of a 20-minute long whale watching sequence. Interesting events (whale, people) are buried in the video of the ocean and the mountains. The video is clustered into six classes, whereas most of the frames are clustered into clusters 3, rightmost in the top row, and 4, left most in the bottom row.

In the next example, the scalability of the approach of the system and method according to the invention class introduction based on the minimum allowable likelihood was introduced. In a 20-minute long video from a whale watching trip, most of the video is jerky and contains the same scene consisting of the mountains and the ocean, while the exciting segments, containing whale breaches and people, are less than a minute long in total. In this sequence, the system and method of the invention was able to jointly stabilize the sequence and find nine clusters that were in the end merged in the six clusters shown in FIG. 9. Most of the sequence was explained with only two clusters, while much shorter and content-rich parts were explained by four clusters. After learning a summary like this, it is easy to find interesting shots in the video.

3.3 Using Mean Class as Metadata.

The system and method according to the present invention can also be used as metadata to categorize metadata, as each mean class represents a summary of a portion of a video sequence. Each class mean is a representative for all frames that are classified to given class. That is, if 10,000 frames are classified to the same class, that means that they are all pretty much alike, and that class mean can be used as a good representative for all 10,000 frames. Class means then becomes metadata-data smaller in size than original video, but that still capture the essentials of the video information.

Review [9] surveys the recent studies in the area of content based video analysis. Although there is no agreed standard to compare different algorithms, of the approach of the system and method of the present invention unifies several stages of video analysis: video partitioning, cut detection, motion characterization, scene representation, and definition of scene similarity measure. The system and method according to the invention can be used to perform all of the above functions.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] B. J. Frey & N. Jojic. Transformation-Invariant Clustering Using the EM Algorithm. IEEE Trans. PAMI, 25:1, January 2003.

[2] B. Frey & N. Jojic. Learning mixture models of images and inferring spatial transforms using the EM algorithm. *CVPR* 99, Ft. Collins, Colo.

[3] N. Jojic, N. Petrovic, B. Frey & T. S. Huang. Transformed hidden Markov models: Estimating mixture models and inferring spatial transformations in video sequences. *CVPR* 2000, Hilton Head Island, S.C.

[4] Frey, B. J. & Jojic, N. Fast, large-scale transformation-invariant clustering. In *Advances in Neural Information Processing Systems* 14. Cambridge, Mass.: MIT Press 2002.

[5] J. K. Wolf, A. M. Viterbi & G. S. Dixon. Finding the best set of K paths through a trellis with application to multi-target tracking. In *IEEE Trans. on Aerospace & Elect. Sys.* pp. 287-296, Vol. 25, No. 2, March 1989.

[6] R. M. Neal & G. E. Hinton. A new view of the EM algorithm that justifies incremental, sparse and other variants. In *Learning in Graphical Models*. Kluwer Academic Publishers, Norwell Mass., Ed. M. I. Jordan, pp. 355-368, 1998.

[7] E. Bauer, D. Coller & Y. Singer. Update rules for parameter estimation in Bayesian networks. In *Proceedings of the Thirteenth UAI.* pp. 3-13, Providence, R.I., 1997.

[8] Carpenter, G. A. & Grossberg, S. Learning, Categorization, Rule Formation, and Prediction by Fuzzy Neural Networks. In Chen, C. H., ed. (1996) *Fuzzy Logic and Neural Network Handbook*, McGraw-Hill, pp. 1.3-1.45

[9] C.-W. Ngo, T.-C. Pong & H.-J. Zhang Recent Advances in Content-Based Video Analysis. In *International Journal of Image and Graphics*, Vol. 1, No. 3, pp. 445-468, 2001.

[10] Z. Ghahramani. Online Variational Bayesian Learning. *Slides from talk presented at NIPS workshop on Online Learning.* 2000.

[11] N. Jojic & B. Frey. Learning flexible sprites in video layers. *CVPR* 2001.

What is claimed is:

1. A system for automatically decomposing an image sequence, comprising a computer-readable storage medium storing a program that when executed causes:
    a computer to perform the following process actions,
    providing an image sequence of at least one image frame of a scene;
    providing only a preferred number of classes of objects to be identified within the image sequence;
    automatically decomposing the image sequence into the preferred number of classes of objects, using probabilistic inference and learning to compute a single set of model parameters comprising a mean visual appearance and variance of each class in the image sequence, processing the provided image sequence and computing the single set of model parameters at a substantially same time that the image sequence is provided, wherein automatically decomposing the image sequence into the preferred number of object classes comprises performing a probabilistic variational expectation-maximization analysis, comprising:
    forming a probabilistic model having variational parameters representing posterior distributions;
    initializing said probabilistic model;
    inputting an image frame from the image sequence;
    computing a posterior given observed data in said image sequence; and
    using the posterior of the observed data to update the probabilistic model parameters.

2. The system of claim 1 wherein providing the preferred number of objects comprises specifying the preferred number of classes of objects via a user interface.

3. The system of claim 1 wherein decomposing the image sequence into the preferred number of objects comprises automatically learning a 2-dimensional model of each object class.

4. The system of claim 3 wherein the model employs a latent image and a translation variable in learning each object class.

5. The system of claim 1 wherein automatically decomposing the image sequence into the preferred number of object classes comprises performing an inferential probabilistic analysis of each image frame for identifying the preferred number of object class appearances within the image sequence.

6. The system of claim 5 wherein performing an inferential probabilistic analysis of each image frame comprises performing a variational generalized expectation-maximization analysis of each image frame of the image sequence, wherein the expectation-maximization analysis employs a Viterbi algorithm in a process of filling in values of hidden variables in a model describing the object class.

7. The system of claim 6 wherein the model describing the object class employs a latent image and a translation variable in filling in said hidden variables.

8. The system of claim 6 wherein an expectation step of the generalized expectation-maximization analysis maximizes a lower bound on a log-likelihood of an image frame by inferring variational approximations of variational parameters.

9. The system of claim 8 wherein a maximization step of the generalized expectation-maximization analysis automatically adjusts object model parameters in order to maximize the lower bound on the log-likelihood of the image frame.

10. The system of claim 9 wherein the expectation step and the maximization step are performed once for each image in said image sequence.

11. The system of claim 8 wherein automatic computation of the expectation step is accelerated by using an FFT-based inference analysis.

12. The system of claim 11 wherein the FFT-based inference analysis is performed on variables that are converted into a coordinate system wherein transforms applied to those variables are represented by shift operations.

13. The system of claim 8 wherein automatic computation of the expectation step is accelerated by using a Viterbi analysis.

14. The system of claim 1 wherein the variational expectation-maximization analysis further comprises:
outputting the model parameters.

15. The system of claim 1 further comprising incrementing to the next image frame in said image sequence and repeating the actions after initializing the probability model until the end of the image sequence has been reached.

16. The system of claim 1 further comprising a generative model which includes a set of model parameters that represent the entire image sequence.

17. The system of claim 1 further comprising a generative model which includes a set of model parameters that represent the images of the image sequence processed to that point.

18. The system of claim 17 wherein the model parameters include:
a prior probability of at least one object class; and
means and variances of object appearance maps.

19. The system of claim 18 wherein the model further comprises observation noise variances.

20. The system of claim 17 further comprising automatically reconstructing a representation of the image sequence from the generative model, wherein the representation comprises the preferred number of object classes.

21. A computer-implemented process for automatically generating a representation of an object in at least one image sequence, comprising a computer-readable storage medium storing a program:
that when executed causes a computer to,
acquire at least one image sequence, each image sequence having at least one image frame;
automatically decompose each image sequence into a generative model with each generative model comprising a set of model parameters comprising a mean visual appearance and variance of each class in the image sequence being decomposed, using an expectation-maximization analysis that employs a Viterbi analysis, wherein each generative model is computed at a substantially same time that the at least one image sequence is acquired, wherein an expectation step of the generalized expectation-maximization analysis maximizes a lower bound on a log-likelihood of each image frame by inferring approximations of variational parameters.

22. The computer-implemented process of claim 21 wherein the number of object classes learned for each image sequence is input via a user interface.

23. The computer-implemented process of claim 21 wherein the model parameters of each generative model include an object class appearance map, and a prior probability of at least one object class.

24. The computer-implemented process of claim 23 wherein the object class appearance map for each generative model includes means and variances of that object class appearance map.

25. The computer-implemented process of claim 21 wherein a latent image and a translation variable are employed in determining said generative model.

26. The computer-implemented process of claim 21 wherein the maximization step of the generalized expectation-maximization analysis automatically adjusts model parameters in order to maximize a lower bound on a log-likelihood of each image frame.

27. The computer-implemented process of claim 21 wherein the expectation-maximization analysis comprises:
forming a probabilistic model having variational parameters representing posterior distributions;
initializing said probabilistic model;
inputting an image frame from the image sequence;
computing a posterior given observed data in said image sequence; and
using the posterior of the observed data to update the probabilistic model parameters.

28. The computer-implemented process of claim 27 wherein the expectation-maximization analysis further comprises:
outputting the model parameters.

29. The computer-implemented process of claim 21 wherein computation of the expectation step is accelerated using an FFT-based inference analysis.

* * * * *